United States Patent [19]

Nishikawa et al.

[11] Patent Number: 5,700,860
[45] Date of Patent: Dec. 23, 1997

[54] LIQUID CRYSTAL ORIENTING AGENT

[75] Inventors: Michinori Nishikawa, Yokkaichi; Tsuyoshi Miyamoto, Yokohama; Shigeo Kawamura, Yokkaichi; Kyouyu Yasuda, Tsu; Yasuaki Mutsuga; Yasuo Matsuki, both of Yokkaichi, all of Japan

[73] Assignee: Japan Synthetic Rubber Co., Ltd., Tokyo, Japan

[21] Appl. No.: 622,280

[22] Filed: Mar. 27, 1996

[30] Foreign Application Priority Data

Mar. 27, 1995 [JP] Japan ................. 7-068074
Feb. 20, 1996 [JP] Japan ................. 8-032204

[51] Int. Cl.⁶ ..................... C08K 5/06; G02F 1/1337
[52] U.S. Cl. ............... 524/317; 524/359; 524/375; 430/20
[58] Field of Search .................. 524/317, 359, 524/375; 430/20

[56] References Cited

U.S. PATENT DOCUMENTS

| | | | |
|---|---|---|---|
| 4,391,994 | 7/1983 | Kogoma et al. | 568/593 |
| 4,634,228 | 1/1987 | Iwasaki et al. | 350/341 |
| 5,149,771 | 9/1992 | Murata et al. | 528/353 |
| 5,276,132 | 1/1994 | Nishikawa et al. | 528/355 |
| 5,298,590 | 3/1994 | Isogai et al. | 528/125 |
| 5,414,126 | 5/1995 | Nakayama et al. | 564/232 |
| 5,422,419 | 6/1995 | Abe et al. | 528/342 |
| 5,430,195 | 7/1995 | Nakayama et al. | 528/125 |
| 5,432,256 | 7/1995 | Abe et al. | 528/353 |
| 5,478,682 | 12/1995 | Nishikawa et al. | 430/20 |
| 5,501,884 | 3/1996 | Nakayama et al. | 528/353 |

FOREIGN PATENT DOCUMENTS 0 365 855  5/1990  European Pat. Off. .
0 503 918  9/1992  European Pat. Off. .
0 683 418  11/1995  European Pat. Off. .

OTHER PUBLICATIONS

Patent Abstracts of Japan, vol. 07, No. 150 (P–207), Jun. 30, 1983, JP–A–58–060729, Apr. 11, 1983.
Database WPI, Derwent Publications, AN–94–202989, JP–A–06–138465, May 20, 1994.

*Primary Examiner*—Kriellions S. Morgan
*Attorney, Agent, or Firm*—Oblon, Spivak, McCelland, Maier & Neustadt, P.C.

[57] ABSTRACT

A liquid crystal aligning agent, which contains (1) at least one polymer selected from a polyamic acid and an imidized polymer therefrom; (2) at least one first solvent selected from the group consisting of N-alkyl-2-pyrrolidones, lactones and 1,3-dialkyl-2-imidazolidinones; (3) at least one second solvent from (a) a phenyl ether solvent of the formula (I):

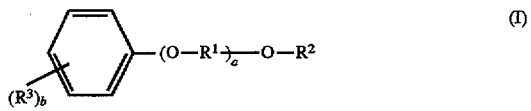

and (b) an ester ether solvent of the formula (II)

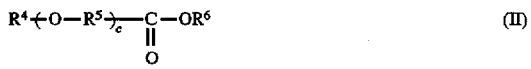

wherein $R^1$–$R^6$, a, b and c are as defined herein.

12 Claims, No Drawings

LIQUID CRYSTAL ORIENTING AGENT

BACKGROUND OF THE INVENTION

1. Field of the Invention

The present invention relates generally to a liquid crystal aligning agent which is used for forming an oriented liquid crystal film for use as a liquid crystal display device. More particularly, the present invention relates to a liquid crystal aligning agent which has an improved aligning property, is excellent in storage stability over a prolonged period of time, and gives a uniform coating property even when ambient temperature varies upon printing.

2. Description of the Related Art

Hitherto, there has been known TN (twisted nematic) liquid crystal display device with a TN liquid crystal cell of a sandwich structure which includes two substrates each having a liquid crystal aligning film formed on the surface thereof through a transparent conductive film and a layer of nematic liquid crystal having a positive dielectric anisotropy provided between the two substrates, the liquid crystal being oriented such that the longitudinal axes of the liquid crystal molecules are twisted continually from 0° to 90° starting from the molecule closest to one of the substrates toward the molecule closest to the other of the substrates. The liquid crystal used in such a TN type liquid crystal display device is oriented generally by using a liquid crystal aligning film which is imparted by a rubbing treatment with an ability to aligning liquid crystal molecules. As the material for a liquid crystal aligning film which is used in liquid crystal display devices, there have been known various resins such as polyimides, polyamides, polyesters, and the like. In particular, polyimides have been used widely for liquid crystal display devices because they are excellent in heat resistance, affinity with liquid crystals, mechanical strength, and so on.

However, liquid crystal display devices with a liquid crystal aligning film formed by coating a liquid crystal aligning agent of a conventional polyamic acid or its imidized polymer by cyclization with dehydration of the polyamic acid tend to suffer uneven film thickness due to variation of ambient temperature or the like factor upon printing of the liquid crystal aligning agent. This gives an adverse influence on display property of the liquid crystal display device. In addition to this problem, another problem arises in that poor storage stability of the liquid crystal aligning agent results in a change in viscosity of a solution of the liquid crystal aligning agent during its storage, which causes fluctuation in the thickness of the resulting film upon printing of the liquid crystal aligning agent.

SUMMARY OF THE INVENTION

The present invention has been accomplished in view of the above-described defects of the conventional liquid crystal aligning agent.

A primary object of the present invention is to provide a liquid crystal aligning agent which is without fail imparted with an ability to aligning liquid crystal molecules by an aligning treatment such as a rubbing treatment and which allows construction therewith a liquid crystal display device having an excellent ability to aligning liquid crystal molecules.

Another object of the present invention is to provide a liquid crystal aligning agent having an excellent storage stability over a prolonged period of time.

Still another object of the present invention is to provide a liquid crystal aligning agent which gives a uniform film thickness even when ambient temperature varies printing or coating it.

To achieve the above-described objects, the present invention provides a liquid crystal aligning agent comprising a solution comprising:

(1) at least one polymer selected from the group consisting of a polyamic acid obtainable by a reaction between a tetracarboxylic acid dianhydride and a diamine compound and an imidized polymer obtainable by cyclization with dehydration of the polyamic acid;

(2) at least one first solvent selected from the group consisting of N-alkyl-2-pyrrolidones, lactones, and 1,3-dialkyl-2-imidazolidinones;

(3) at least one second solvent selected from the group consisting of:

(a) a first compound represented by general formula (I)

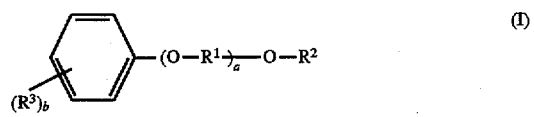

wherein $R^1$ is an alkylene group having 2 or 3 carbon atoms; $R^2$ is an alkyl group having 1 to 4 carbon atoms an acetyl group or a propionyl group; $R^3$ is an alkyl group having 1 to 3 carbon atoms, an alkoxyl group having 1 to 3 carbon atoms, or a halogen atom; a is 1 or 2; and b is 0 or integers of from 1 to 5; and (b) a second compound represented by general formula (II)

wherein $R^4$ is an alkyl group having 1 to 4 carbon atoms; $R^5$ is an alkylene group having 2 or 3 carbon atoms; $R^6$ is an alkyl group having 1 to 3 carbon atoms; and c is 1 or 2.

Here, the solution may preferably be a homogeneous solution comprising:

(a) 1 to 10% by weight of the polymer (1) above,
(b) 29 to 95% by weight of the first solvent (2) above, and
(c) 4 to 70% by weight of the second solvent (3) above.

Other and further objects, features and advantages of the present invention will become more apparent from the following description of preferred embodiments.

DETAILED DESCRIPTION OF THE INVENTION

The present invention will be described in detail hereinafter.

The liquid crystal aligning agent of the present invention comprises a specific polymer (A) and/or a specific polymer (B) obtained by reacting a compound (I) with a compound (II).

Compound (I)

Compound (I) used for preparing the specific polymer (A) includes tetracarboxylic dianhydrides, for example, aliphatic or alicyclic tetracarboxylic dianhydrides, such as alkanetetracarboxylic dianhydrides, e.g., butanetetracarboxylic dianhydride; mono- or polycyclic cycloalkanetetracarboxylic dianhydrides, e.g., 1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexyltetracarboxylic dianhydride, 2,3,5-tricarboxycyclopentylacetic dianhydride, 3,5,6- tricarboxynorbornane-2-carboxylic dianhydride, 2,3,4-tetrahydrofurantetracarboxylic dianhydride, 5-(2,5-dioxotetrahydrofuryl)-3-methyl-3-cyclo-hexene-1,2-dicarboxylic dianhydride, bicyclo[2,2,2]-oct-7-ene-2,3,5,6-tetracarboxylic dianhydride, tetracyclo[6.2.1.0$^{2,7}$]dodecane-4,5,9,10-tetra-carboxylic dianhydride, 1,3,3a,4,5,9b-hexahydro-5-(tetrahydro-2,5-dioxo-3-furanyl)naphtho[1,2-c]furan-1,3-dione, 1,3,3a,4,5,9b-hexahydro-5-methyl-5-(tetrahydro-2,5-dioxo-3-furanyl)naphtho[1,2-c]furan-1,3-dione, 1,3,3a,4,5,9b-hexahydro-5-ethyl-5-(tetrahydro-2,5-dioxo-3-furanyl)naphtho[1,2-c]furan-1,3-dione, 1,3,3a,4,5,9b-hexahydro-7-methyl-5-(tetrahydro-2,5-dioxo-3-furanyl)naphtho[1,2-c]furan-1,3-dione, 1,3,3a,4,5,9b-hexahydro-7-ethyl-5-(tetrahydro-2,5-dioxo-3-furanyl)naphtho[1,2-c]furan-1,3-dione, 1,3,3a,4,5,9b-hexahydro-8-methyl-5-(tetrahydro-2,5-dioxo-3-furanyl)naphtho[1,2-c]furan-1,3-dione, 1,3,3a,4,5,9b-hexahydro-8-ethyl-5-(tetrahydro-2,5-dioxo-3-furanyl)naphtho[1,2-c]furan-1,3-dione, and the like; mono- or polycyclic aromatic tetracarboxylic dianhydrides, e.g., pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetra-carboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)-diphenylsulfone dianhydride, 4,4'-bis(3,4-dicarboxy-phenoxy)diphenylpropane dianhydride, 3,3',4,4'-perfluoroisopropylidenediphthalic dianhydride, 3,3',4,4'-biphenyltetracarboxylic dianhydride, bis(phthalic acid)phenylphosphine oxide dianhydride, p-phenylenebis(triphenylphthalic acid) dianhydride, m-phenylenebis(triphenylphthalic acid) dianhydride, bis(triphenylphthalic acid)-4,4'-diphenylether dianhydride, bis(triphenylphthalic acid)-4,4'-diphenyl-methane dianhydride, ethylene glycol bis(anhydro-trimellitate), propylene glycol bis(anhydro-trimellitate), 1,4-butanediol bis(anhydrotri-mellitate), 1,6-hexanediol bis(anhydrotrimellitate), 1,8-octanediol bis(anhydrotrimellitate), 2,2-bis(hydroxyphenyl)propanebis(anhydrotrimellitate), and the like; 3,6 -bis(anhydrotrimellitate)cholestanes represented by the general formula (III) below:

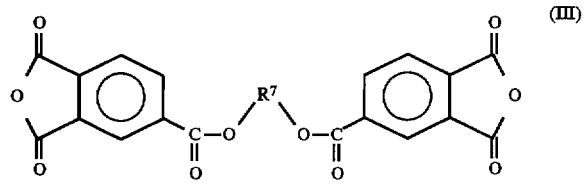
(III)

wherein R$^7$ is a divalent organic group selected from the group consisting of groups represented by general formulas (IV) to (IX) below:

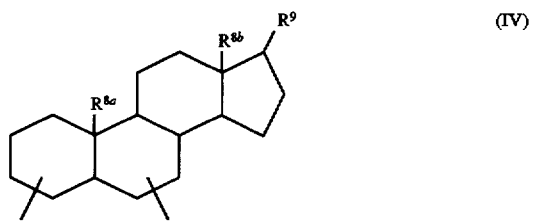
(IV)

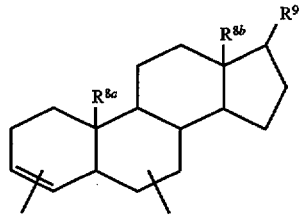
(V)

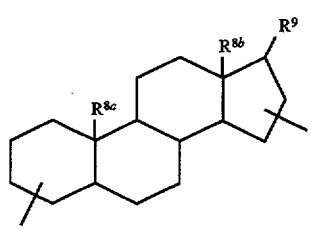
(VI)

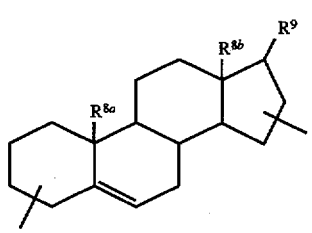
(VII)

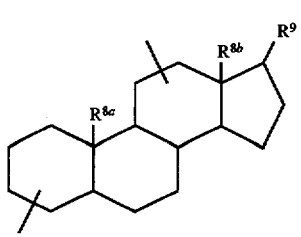
(VIII)

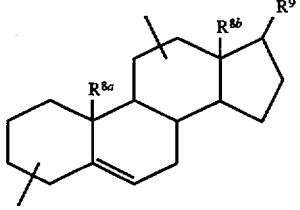
(IX)

(wherein R$^{8a}$ and R$^{8b}$ are independently a methyl group or a hydrogen atom; and R$^9$ is an alkyl group having 1 to 20 carbon atoms); and the like.

Of the above-described tetracarboxylic dianhydrides, particularly preferred because of excellent ability of aligning liquid crystal molecules are butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 5-(2,5-dioxotetrahydrofuryl)-3-methyl-3-cyclohexene-1,2-dicarboxylic dianhydride, 1,3,3a,4,5,9b-hexahydro-5-(tetrahydro-2,5-dioxo-3-furanyl)naphtho[1,2-c]furan-1,3-dione, 1,3,3a,4,5,9b-hexahydro-8-methyl-5-(tetrahydro-2,5-dioxo-3-furanyl)naphtho[1,2-c]furan-1,3-dione, bicyclo[2,2,2]-oct-7-ene-2,3,5,6-tetracarboxylic dianhydride, pyromellitic dianhydride, 3,3',4,4'-benzophenonetetracarboxylic dianhydride, 3,3',4,4'-biphenylsulfonetetracarboxylic dianhydride, tetracyclo-[6.2.1.0$^{2,7}$]dodecane-4,5,9,10-tetracarboxylic dianhydride, 3,3',4,4'-perfluoroisopropylidenediphthalic dianhydride, 3,3',4,4'-biphenyltetracarboxylic dianhydride, the compounds represented by the general formula (III), and 1,4,5,8-naphthalenetetracarboxylic dianhydride.

These compounds may be used singly or two or more of them may be used in combination.

Here, the compounds represented by the general formula (III) can be obtained by reacting anhydrous trimellitic dichloride with asteroid compound having two hydroxyl groups.

Examples of the steroid compound having two hydroxyl groups include cholestane-3,6-diol, cholestane-3,7-diol, cholestane-3,8-diol, cholestane-3,11-diol, cholestane-3,12-diol, cholestane-3,15-diol, cholestane-3,16-diol, cholestane-6,11-diol, cholestane-6,12-diol, cholestane-6,15-diol, cholestane-6,16-diol, cholestane-11,15-diol, cholestane-11,16-diol, and the like.

Of these cholestanediols, preferred are cholestane-3,6-diol, cholestane-3,7-diol, cholestane-3,11-diol, and cholestane-3,15-diol.

Preferred examples of the compound represented by the general formula (III) include compounds represented by the general formulas (III-1), (III-2) or (III-3) below:

dimethyl-4,4'-diaminobiphenyl, 4,4'-diaminobenzanilide, 3,4-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(aminophenoxy)benzene, 4,4'-(p-phenylenediisopropylidene)bisaniline, 4,4'-(m-phenylenediisopropylidene)bisaniline, 1,3-bis(4-aminophenoxy)benzene, 1,3-bis(3-aminophenoxy)benzene, 9,9-bis(4-aminophenyl)-10-hydroanthracene, 9,9-bis(4-aminophenyl)fluorene, 4,4'-methylenebis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 5-amino-1-(4'-aminophenyl)-1,3,3-trimethylindane, 6-amino-1-(4'-aminophenyl)-1,3,3-trimethylindane, 2,7-diamino-fluorene, 3,5-amino-3'-trifluoromethylbenzanilide, 3,5-amino-4'-trifluoromethylbenzanilide, 3,4'-diaminodiphenyl ether, 3,3'-diaminobenzophenone, 3,4'-diaminobenzophenone, 4,4'-diaminobenzophenone, 4,4'-(p-phenyleneisopropylidene)bisaniline, 2,2-bis[4-(amino-2-trifluoromethylphenoxy)phenyl]hexafluoropropane, 4,4'-

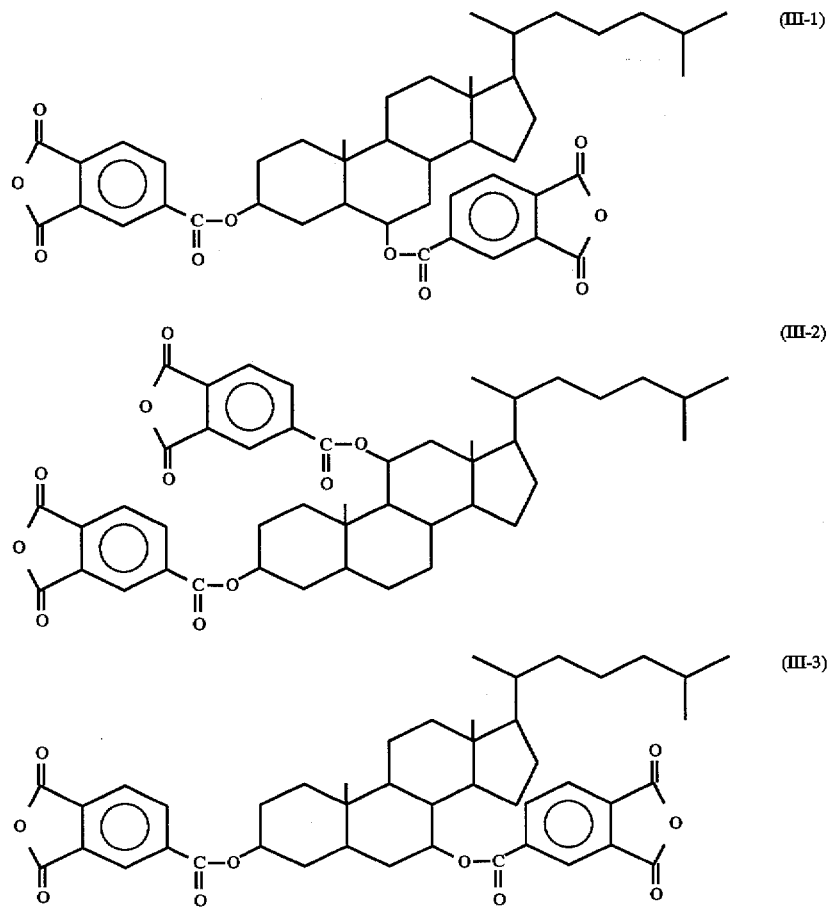

Compound (II)

The compound (II) used for preparing the specific polymer (A) includes, for example, aromatic diamines such as p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 4,4'-diaminodiphenyl ether, 1,5-diaminonaphthalene, 3,3'- diamino-2,2'-bis(trifluoromethyl)-biphenyl, 4,4'-bis[(4-amino-2-trifluoromethyl)-phenoxy]octafluorobiphenyl, bis(aminophenoxy)-2,2'-dimethylpropane, and the like; hetero atom-containing aromatic diamines such as diaminotetraphenylthiophene, and the like; aliphatic or alicyclic diamines such as 1,1-metaxylylenediamine, 1,3-bis(aminomethyl)cyclo-hexane, 1,4-bis(aminomethyl)

cyclohexane, 1,2-ethylene-diamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, 1,2-diaminocyclohexane, 1,3-diaminocyclohexane, isophoronediamine, tetrahydrodicyclopentadienylenediamine, hexahydro-4,7-methanoindanylenedimethylenediamine, tricyclo[6.2.1.0$^{2,7}$] undecylenedimethyldiamine, 4,4'-methylenebis (cyclohexylamine), and the like; diaminoorganosiloxanes represented by the general formula (X)

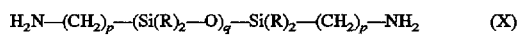

wherein R contains 1 to 12 carbon atoms and is an alkyl group such as a methyl group, an ethyl group, a propyl group, etc., a cycloalkyl group such as cyclohexyl group, or an aryl group such as a phenyl group, and the like, p is an integer of 1 to 3, and q is an integer of 1 to 20; and diamines having a steroid skeleton represented by the general formulas (XI) to (XXV) below:

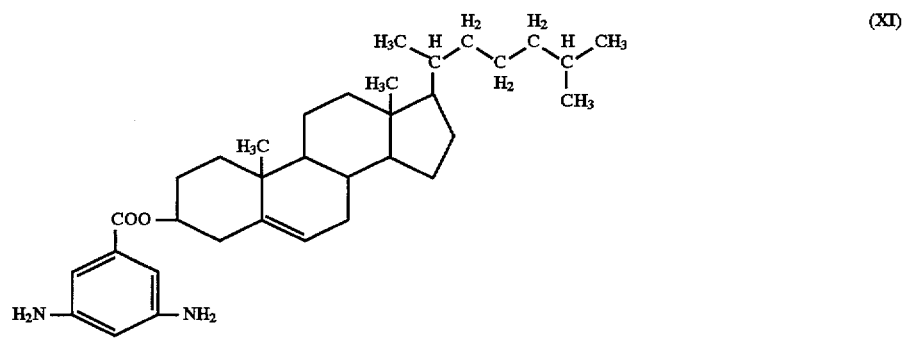

(XI)

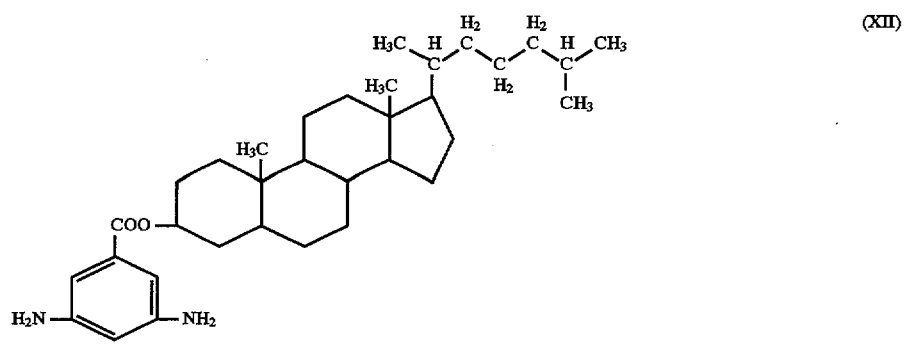

(XII)

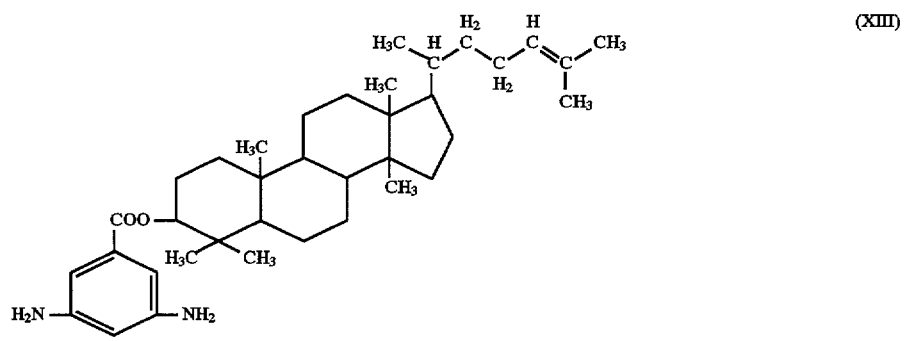

(XIII)

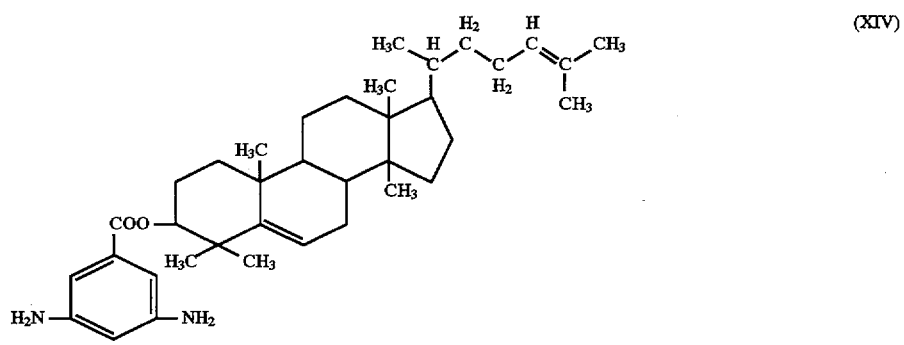

(XIV)

-continued
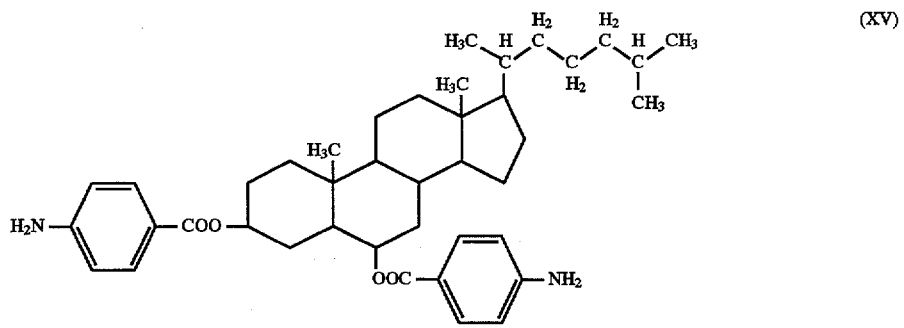 (XV)
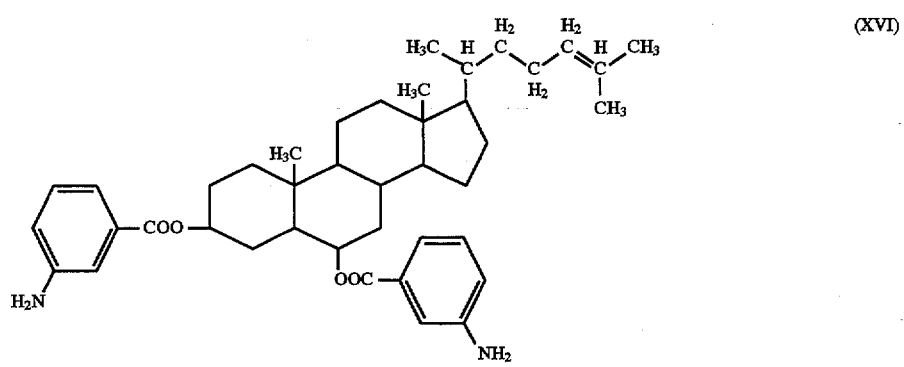 (XVI)
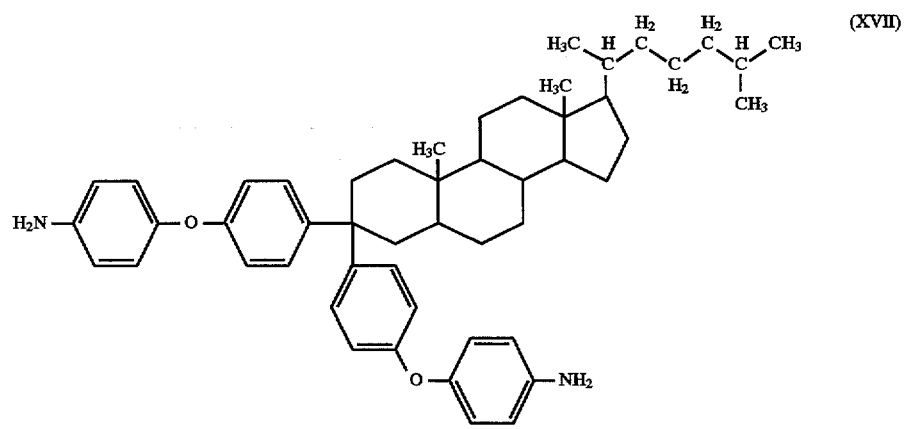 (XVII)
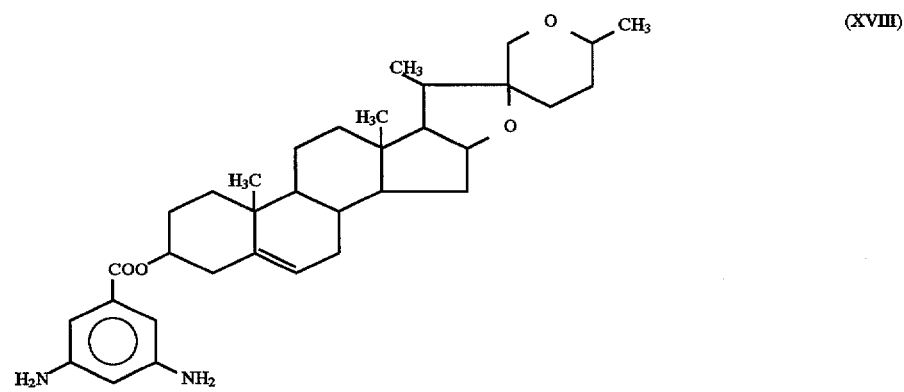 (XVIII)

-continued

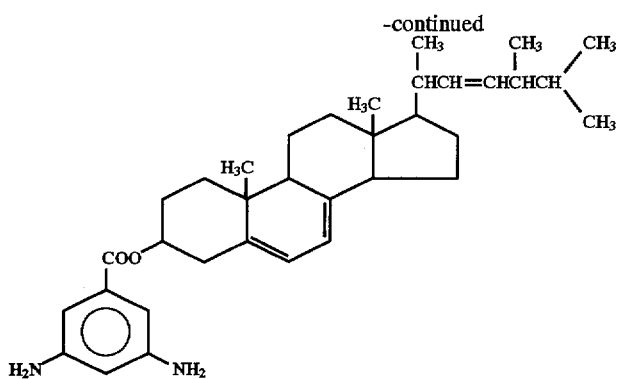 (XIX)

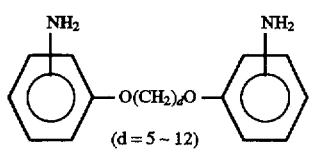 (XX)
(d = 5~12)

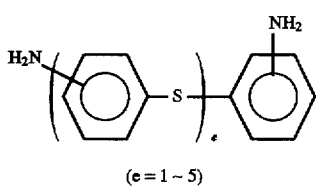 (XXI)
(e = 1~5)

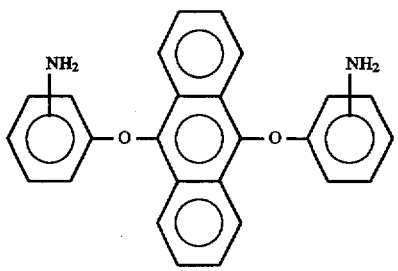 (XXII)

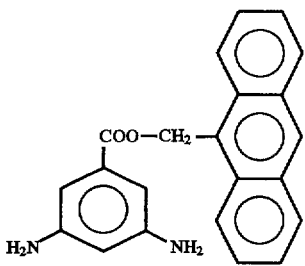 (XXIII)

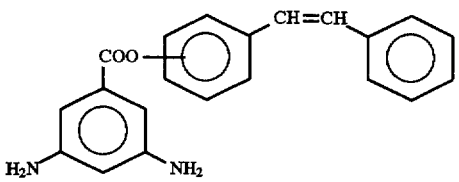 (XXIV)

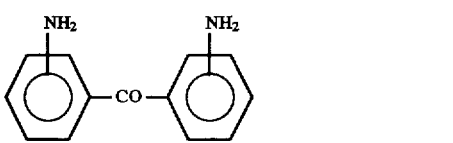 (XXV)

Of these diamine compounds, preferred because of having an excellent ability to aligning liquid crystal molecules are p-phenylenediamine, 4,4'-diaminodiphenylmethane, 4,4'-diaminodiphenyl ether, 2,2-bis[4-(4-aminophenoxy)] phenylpropane, 9.9-bis(4-aminophenyl)fluorene, 2,2-bis[4-(4-aminophenoxy)phenyl]hexafluoropropane, 2,2-bis(4-aminophenyl)hexafluoropropane, 4,4'-(m-phenylenediisopropylidene)bis-aniline, 1,4- cyclohexanediamine, 4,4'-methylenebis(cyclohexylamine), 1,5-diaminonaphthalene, 2,7-diaminofluorene, 2,2-bis[4-(4-amino-2-trifluoromethylphenoxy)phenyl] hexafluoropropane, 4,4'-diamino-2,2'-bis(trifluoromethyl) biphenyl, 4,4'-bis[(4-amino-2-trifluoromethyl)phenoxy] octafluorobiphenyl, 3,5-diamino-4'-trifluoromethylbenzanilide, and those diamines represented by the general formulas (XI) to (XXV) above. These diamine compounds may be used singly or two or more of them may be used in combination. The diamine compounds may be commercially available ones, which may be used as they are or after reduction.

Proportion of Compound (I) to Compound (II)

The compounds (I) and (II) for preparing the specific polymer (A) are used in proportions of preferably from 0.2 to 2 equivalents, more preferably from 0.3 to 1.4 equivalents, of acid anhydride group contained in compound (I) per equivalent of amino group contained in compound (II). The above range of proportion is preferred since in either of the cases where the amount of the acid anhydride group contained in compound (I) is below 0.2 equivalent or exceeds 2 equivalents, the resulting polymer has insufficient molecular weight so that in some cases the liquid crystal aligning agent may have poor coatability.

Preparation of Specific Polymer (A)

The specific polymer (A) which constitutes the liquid crystal aligning agent of the present invention can be prepared by reacting compound (I) with compound (II) described above. The reaction proceeds in an organic solvent at temperatures usually from 0° C. to 200° C., preferably from 0° C. to 100° C. The temperature range is preferred since at the reaction temperature below 0° C., the compounds have poor solubilities in the solvent used while above 150° C., the resulting polymer has a decreased molecular weight.

As for the organic solvent used in the preparation of the specific polymer (A), there is no limitation and any solvent may be used as far as it can dissolve the specific polymer (A) which is produced in the reaction. Examples of such a solvent includes aprotic polar solvents such as γ-butyrolactone, N-methyl-2-pyrrolidone, 1,3-dimethyl-2-imidazolidinone, N,N-dimethylformamide, N,N-dimethylacetamide, dimethyl sulfoxide, tetramethylurea, hexamethylphosphotriamide, etc.; phenol-based solvents such as m-cresol, xylenol, phenol, halogenated phenol, etc.

When the weight of the organic solvent is (a) and the total weight of the compounds (I) and (II) is (b), the organic solvent is used preferably in an amount:

$$\frac{(a)}{(a)+(b)} \times 100 = 0.1 \text{ to } 30 \text{ (\% by weight)}.$$

As the above-described organic solvent, there can be used alcohols, ketones, esters, ethers, halogenated hydrocarbons, hydrocarbons, and the like which are a bad solvent to the specific polymer (A) in suitable amounts so that they do not precipitate the specific polymer (A). Specific examples of such a bad solvent include methanol, ethanol, isopropyl alcohol, cyclohexanol, ethylene glycol, propylene glycol, 1,4-butanediol, triethylene glycol, ethylene glycol monomethyl ether, acetone, methyl ethyl ketone, methyl isobutyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol n-propyl ether, ethylene glycol i-propyl ether, ethylene glycol n-butyl ether, ethylene glycol n-hexyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monobutyl ether, diethylene glycol monomethyl ether acetate, diethylene glycol monoethyl ether acetate, ethylene glycol methyl ether acetate, ethylene glycol ethyl ether acetate, ethylene glycol n-propyl ether acetate, ethylene glycol n-butyl ether acetate, ethylene glycol n-hexyl ether acetate, 4-hydroxy-4-methyl-2-pentanone, ethyl 2-hydroxypropionate, ethyl 2-hydroxy-2-methylpropionate, ethyl ethoxyacetate, ethyl hydroxyacetate, methyl 2-hydroxy-3-methyl-butanoate, methyl 3-methoxypropionate, ethyl 3-methoxypropionate, ethyl 3-ethoxypropionate, methyl 3-ethoxypropionate, 3-methyl-3-methoxybutanol, 3-ethyl-3-methoxybutanol, 2-methyl-2-methoxybutanol, 2-ethyl-2-methoxybutanol, 3-methyl-3-ethoxybutanol, 3-ethyl-3-ethoxybutanol, 2-methyl-2-methoxybutanol, 2-ethyl-2-ethoxybutanol, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, and the like.

By the above-described reaction, the specific polymer (A) is dissolved to produce a polymer solution. Then, this polymer solution is poured into a large amount of a bad solvent for the specific polymer (A) to for precipitates, followed by drying under reduced pressure to yield the specific polymer (A). Furthermore, the specific polymer (A) thus obtained may be dissolved again in an organic solvent and precipitated in a bad solvent to the specific polymer (A). This procedure may be repeated two more times. In this manner, the specific polymer (A) can be purified.

In the case where the acid anhydride represented by the general formula (III) is used as the compound (I), a group of examples of the specific polymer (A) are represented by the general formula (XXVI) below:

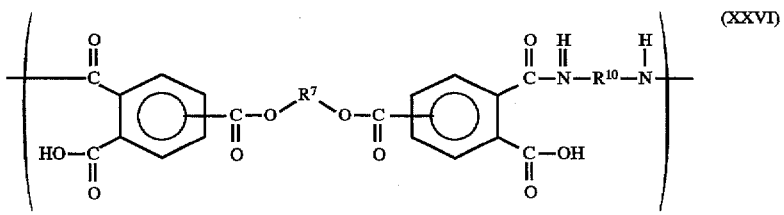

wherein $R^7$ is as defined above; $R^{10}$ is a divalent organic residue derived from a diamine compound selected from the compound (II) by removing the two amino groups.

Specific Polymer (B)

The specific polymer (B) which constitute the liquid crystal aligning agent of the present invention can be prepared by one of the preparation methods (1) to (3) hereinbelow. Here, the specific polymer (B) generally is a polyimide. In the preparation method (2) described hereinbelow, a polyisoimide can be also generated. In this connection, the specific polymer (B) used in the present invention includes both "polyimides" and "polyisoimides". It is preferred to use polyimides as the specific polymer because they can be prepared without difficulty.

Preparation Method (1)

The first preparation method for the preparation of the specific polymer (B) is a method in which the specific polymer (A) is heated. In this method, heating temperature is usually from 60° C. to 250° C., preferably from 100° C. to 200° C. At heating temperatures below 60° C., imidation reaction can proceed only insufficiently. On the other hand, the resulting specific polymer (B) may have a molecular weight decreased to an unacceptable extent.

Preparation Method (2)

The second preparation method for the preparation of the specific polymer (B) is a method in which the specific polymer (A) is dissolved in an organic solvent, followed by adding a dehydrating agent and a catalyst for cyclization with dehydration, with optional heating.

As the dehydrating agent which can be used in this method, there can be used acid anhydrides, for example, acetic anhydride, propionic anhydride, trifluoroacetic anhydride, and the like. The dehydrating agent is used in an amount of, preferably, from 1.6 to 20 moles per mole of the repeating unit of the specific polymer (A).

The catalyst for cyclization with dehydration which can be used in this method may be tertiary amines, for example, pyridine, collidine, lutidine, triethylamine, and the like. The catalyst may be used in an amount of from 0.5 to 10 moles per mole of the dehydrating agent.

As the organic solvent, there can be used those employed in the preparation of the specific polymer (A). In this method, the specific polymer (A) as the starting material need not be a purified one and the reaction mixture may be used as is in the reaction for preparing the specific polymer (B). The cyclization with dehydration an proceed at a temperature of usually from 0° C. to 200° C., preferably from 60° C. to 150° C.

Preparation Method (3)

The third preparation method is a method in which a tetracarboxylic dianhydride is mixed with a diisocyanate, with optional heating, to form a condensate. Specific examples of the diisocyanate compound which can be used in this method include aliphatic diisocyanate compounds such as hexamethylene diisocyanate, etc.; aliphatic diisocyanates such as cyclohexane diisocyanate, etc.; aromatic diisocyanates such as diphenylmethane-4,4'-diisocyanate, diphenylether-4,4'-diisocyanate, diphenylsulfone-4,4'-diisocyanate, diphenylsulfide-4,4'-diisocyanate, 1,2-diphenylethane-p,p'-diisocyanate, 2,2-diphenylpropane-p, p'-diisocyanate, 2,2-diphenyl-1,1,1,3,3,,3-hexafluoropropane-p,p'-diisocyanate, 2,2-diphenylbutane-p, p'-diisocyanate, diphenyldichloromethane-4,4'-diisocyanate, diphenylfluoromethane-4,4'-diisocyanate, benzophenone-4,4'-diisocyanate, N-phenylbenzamide-4,4'-diisocyanate, etc. These diisocyanate compounds may be used singly or two or more of them may be used in combination.

In this method, catalysts do not have to be used. The reaction temperature is usually from 50° C. to 200° C., preferably 100° C. to 160° C. The specific polymer (B) can be purified in the same manner as the specific polymer (A) as described above.

Intrinsic Viscosity of the Specific Polymers

The specific polymers (A) and (B) prepared as described above have an intrinsic viscosity (as measured at 30° c. in N-methyl-2-pyrrolidone, hereafter the same) within the ranges of usually from 0.05 to 10 dl/g, preferably from 0.05 to 5 dl/g.

Terminal Modified Specific Polymers

The specific polymers (A) and/or (B) which constitute(s) the liquid crystal aligning agent of the present invention may be a terminal modified polymer. The terminal modified polymers have a controlled molecular weight so that they can improve properties, such as printability, of the resulting liquid crystal aligning agent without deteriorating the effects of the present invention. The terminal modified polymers can be prepared by adding an acid anhydride, a monoamine compound or a monoisocyanate compound to the reaction mixture when the specific polymer (A) is prepared.

Examples of the acid anhydride used for preparing a terminal modified specific polymer (A) include maleic anhydride, phthalic anhydride, itaconic anhydride, n-decylsuccinic anhydride, n-dodecylsuccinic anhydride, n-tetradecylsuccinic anhydride, n-hexadecylsuccinic anhydride, etc. As the monoamine compounds which can be added to the reaction mixture may be, for example, aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-octadecylamine, n-eicosylamine, etc. As the monoisocyanate compound, there can be cited, for example, phenyl isocyanate, naphthyl isocyanate, etc.

Liquid Crystal Aligning Agent

The liquid crystal aligning agent of the present invention can typically be prepared by dissolving the specific polymer (A) and/or (B) described above in the first solvent described hereinafter and adding the second solvent to form a solution.

However, the preparation of the liquid crystal aligning agent of the present invention is not limited to the above-described method but it may be prepared by various other methods. For example, there can be utilized a method in which at least one of the specific polymers (A) and (B) (hereafter, simply referred to "specific polymer") is dissolved in a mixture of the first and second solvents; a method in which the first solvent is added to a solution of the specific polymer in the second solution; a method in which a solution of a part of the specific polymer in the first solvent and a solution of the rest of the specific polymer in the second solvent are mixed with each other; and the like.

Concentration of Specific Polymer

In the polymer solution used for preparing the liquid crystal aligning agent of the present invention, the specific polymer (i.e., specific polymer (A) and/or specific polymer (B)) may exist in an amount of preferably from 1 to 10% by weight, more preferably from 2 to 8% by weight based on the total weight of the polymer solution. When the amount of the specific polymer is below 1% by weight, sometimes the resulting liquid crystal aligning film is too thin to avoid the occurrence of pinholes. On the other hand, when the specific polymer is in a concentration of above 10% by weight, it is sometimes difficult to form a thin film having a uniform thickness.

First Solvent

As the first solvent, there can be used at least one solvent selected from N-alkyl-2-pyrrolidones, lactones and 1,3-dialkyl-2-imidazolidines where alkyl groups have preferably 1 to 6 atoms. Examples of the N-alkyl-2-pyrrolidones include N-methyl-2-pyrrolidone, N-ethyl-2-pyrrolidone, etc. The lactones include γ-butyrolactone, etc. The 1,3-dialkyl-2-imidazolidinones include, for example, 1,3-dimethyl-2-imidazolidinone, etc. The first solvent may exist in the liquid crystal aligning agent of the present invention in an amount of, usually from 29 to 95% by weight, preferably from 60 to 95% by weight. When the first solvent is used in an amount of below 29% by weight, it may be sometimes difficult to dissolve the specific polymer sufficiently while the use of more than 95% by weight of the first solvent decreases the proportion of the second solvent to a level too small to allow the polymer solution to form a thin film having a highly uniform film thickness.

Second Solvent

The second solvent includes the phenyl ether solvent represented by the general formula (I) above and the ester ether solvents represented by the general formula (II) above. Specific examples of such solvents include ethylene glycol diether solvents such as ethylene glycol methyl phenyl ether, ethylene glycol ethyl phenyl ether, ethylene glycol n-propyl phenyl ether, ethylene glycol isopropyl phenyl ether, ethylene glycol n-butyl phenyl ether, ethylene glycol isobutyl phenyl ether, ethylene glycol tert-butyl phenyl ether, etc.; diethylene glycol diether solvents such as diethytene glycol methyl phenyl ether, diethylene glycol methyl phenyl ether, diethylene glycol ethyl phenyl ether, diethylene glycol n-propyl phenyl ether, diethylene glycol isopropyl phenyl ether, diethylene glycol n-butyl phenyl ether, diethylene glycol isobutyl phenyl ether, diethylene glycol tert-butyl phenyl ether, etc.; propylene glycol diether solvents such as propylene glycol methyl phenyl ether, propylene glycol ethyl phenyl ether, propylene glycol n-propyl phenyl ether, propylene glycol isopropyl phenyl ether, propylene glycol n-butyl phenyl ether, propylene glycol isobutyl phenyl ether, propylene glycol tert-butyl phenyl ether, etc.; dipropylene glycol diether solvents such as dipropylene glycol methyl phenyl ether, dipropylene glycol methyl phenyl ether, dipropylene glycol ethyl phenyl ether, dipropylene glycol n-propyl phenyl ether, dipropylene glycol isopropyl phenyl ether, dipropylene glycol n-butyl phenyl ether, dipropylene glycol isobutyl phenyl ether, dipropylene glycol tert-butyl phenyl ether, etc.; glycol ether ester solvents such as ethylene glycol phenyl ether acetate, ethylene glycol phenyl ether propionate, diethylene glycol phenyl ether, diethylene glycol phenyl ether propionate, propylene glycol phenyl ether acetate, propylene glycol phenyl ether propionate, dipropylene glycol phenyl ether acetate, dipropylene glycol phenyl ether propionate, etc.; ester solvents such as methyl 3-methoxypropionate, ethyl 3-ethoxypropionate, ethyl 3-methoxypropionate etc.; and the like.

Of these solvents, particularly preferred are ethylene glycol methyl phenyl ether, ethylene glycol ethyl phenyl ether, diethylene glycol methyl phenyl ether, propylene glycol methyl phenyl ether, propylene glycol ethyl phenyl ether, dipropylene glycol methyl phenyl ether, ethylene glycol phenyl ether acetate, propylene glycol phenyl ether acetate, methyl 3-methoxypropionate, and ethyl 3-ethoxypropionate.

These solvents may be used singly or two or more of them may be used in combination.

The second solvent is used in an amount of usually from 4 to 70% by weight, preferably 4 to 39% by weight based on the total weight of the polymer solution. When this amount exceeds 70% by weight, which decreases the amount of the first solvent accordingly, the resulting specific polymer does not dissolve sufficiently so that the solution of the specific polymer may sometimes contain precipitates or be gelled. On the other hand, if the proportion of the second solvent is below 4% by weight, it may be sometimes difficult for the polymer solution to form a thin film having a highly uniform thickness.

The liquid crystal aligning agent of the present invention may contain the third solvent, if desired. As the third solvent may be used the bad solvents that are used for the preparation of the specific polymer (A). The third solvent may exist in an amount of, usually no higher than 30% by weight, preferably no higher than 20% by weight, based on the total weight of the liquid crystal aligning agent of the present invention. Examples of the third solvent includes alcohols such as methanol, ethanol, isopropyl alcohol, cyclohexanol, ethylene glycol, propylene glycol, 1,4-butanediol, triethylene glycol, acetone, methyl ethyl ketone, methyl isobutyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol n-propyl ether, ethylene glycol i-propyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, tetrahydrofuran, dichloromethane, 1,2-dichloroethane, 1,4-dichloro-butane, trichloroethane, chlorobenzene, o-dichloro-benzene, hexane, heptane, octane, benzene, toluene, xylene, and the like.

The liquid crystal aligning agent of the present invention, which contains a polyamic acid and/or an imide polymer (polyimide), more particularly, the specific polymer (A) and/or specific polymer (B), may further contain various additives in order to improve the properties of the liquid crystal aligning agent itself, such as adhesion to the surface of a substrate, or the properties of the liquid crystal aligning film made therefrom.

Such additives include functional silane group containing compounds, for example, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, etc. Furthermore, the reaction products between a tetracarboxylic dianhydride and an amino group-containing silane compound as disclosed in Japanese Patent Application Laying-open No. 291922/1988 may also be used as an additive.

Still further, the liquid crystal aligning agent of the present invention may contain various thermosetting resins in order to stabilize pretilt angles and increase the strength of the resulting film.

As the thermosetting resin, polyepoxides are effective. Examples of the polyepoxides which can be used include bisphenol A epoxy resins, phenol novolak epoxy resins, cresol novolak epoxy resins, alicyclic epoxy resins, glycidyl ester epoxy resins, glycidyl diamine epoxy resins, heterocyclic epoxy resins, epoxy group-containing acrylic resins, etc.

Commercially available polyepoxides are, for example, EPOLITE 400E and EPOLITE 3002 (trade names for products fabricated by KYOEISHA YUSHI KAGAKU KOGYO CO., LTD.), EPIKOTE 828, EPIKOTE 152, EPIKOTE 180S65, EPIKOTE 180S75 (trade names for products fabricated by YUKA SHELL EPOXY CO., LTD.), and the like.

In the case where the above-described polyepoxides are used, base catalysts such as 1-benzyl-2-methylimidazole may be added in order to increase the efficiency of the cross-linking reaction involved.

The liquid crystal aligning agent of the present invention may contain one or more polyamic acids and/or their reaction product, i.e., polymers obtained by cyclization with dehydration of the polyamic acid(s), other than either the specific polymers (A) or the specific polymer (B).

As described above, the liquid crystal aligning agent of the present invention may contain polymers other the specific polymers (A) or (B). In this case, the proportion of the specific polymers (A) and/or (B) is preferably not smaller than 20% by weight, and more preferably not smaller than 50% by weight based on the total weight of the polymers.

Fabrication of Liquid Crystal Display Device

The liquid crystal display device of the present invention can be fabricated, for example, by the following method.

(1) Film Formation

A substrate having a patterned transparent electrode on one surface thereof is provided. The liquid crystal aligning agent of the present invention is coated on the side of the transparent electrode of the substrate by a roll coating process, a spin coating process, a printing process, or the like. The coating film is heated at a temperature of from 80° C. to 250° C., preferably 120° C. to 200° C., to form a film. The film is of usually from 0.001 to 1 µm thick, preferably from 0.005 to 0.5 µm. As the transparent substrate are used glass such as float glass and soda glass, plastic films made of polyethylene terephthalate, polybutylene terephthalate, polyether sulfone, polycarbonate or the like.

As the above-described transparent electrically conductive film may be used NESA film (registered trade mark owned by PPG, U.S.A.), ITO film made of indium oxide-tin oxide ($In_2O_3$-$SnO_2$), and the like. These transparent electrically conductive films can be patterned by photo etching, by using a mask.

Upon coating the liquid crystal aligning agent of the present invention, a functional silane group containing compound, a functional titanium compound, or the like may be coated on one surface of the substrate and on the transparent electrically conductive film in order to further improve adhesion of the liquid crystal to the substrate and to the transparent electrically conductive film.

(2) Aligning Treatment

The thin film thus formed is given an aligning treatment. This aligning treatment is performed by a rubbing treatment in which a surface of the thin film is rubbed with a roll clad with a piece of cloth made of, for example, nylon, rayon, cotton, or the like in a predetermined direction, or irradiation treatment in which a surface of the coated thin film is irradiated with a radiation such as ultraviolet rays, e.g., polarized UV, a method in which a coating film is formed by a Langmuir-Blodget method, uniaxial stretching or the like, or other means. This aligning treatment imparts an ability of aligning liquid crystal molecules to the liquid crystal aligning thin film.

In particular, it is possible to improve the visual characteristics of the liquid crystal display device using the thin film or liquid crystal aligning film made from the liquid crystal aligning agent of the present invention. Such improvement can be achieved by irradiating UV rays onto the thin film or liquid crystal aligning film to vary pretilt angles of the liquid crystal molecules as described in Japanese Patent Application Laying-open No. 222366/1994 and Japanese Patent Application Laying-open No. 281937/1994 or by a treatment in which a resist is coated on a part of the liquid crystal aligning film to alter the direction of rubbing of the liquid crystal aligning film.

(3) Two substrates are fabricated which have on one surface thereof a liquid crystal aligning film prepared as described above. The substrates are arranged to face each other via a cell gap so that the rubbing directions of the respective liquid crystal aligning films are perpendicular, parallel or antiparallel to each other. Then, peripheral portions of the two substrates are glued or otherwise sealed with a sealant to form cell gaps divided or defined by the surfaces of the substrates and the sealant forming as side walls. Injection holes communicating to the respective cavities thus formed are formed, through which a liquid crystal is injected, followed by sealing the holes to construct liquid crystal cells. A polarizing plate is laminated on an outer surface of the liquid crystal cell, i.e., on a surface of each of the substrates which constitute the liquid crystal cell opposite to the surface on which the sealant is provided. The polarizing plate is arranged such that the direction of polarization by the polarizing plate coincides with or at right angles to the direction of rubbing of the liquid crystal aligning film on which the polarizing plate is provided through the substrate. Thus, a liquid crystal display device is fabricated.

As the sealant, may be used, for example, epoxy resins which contain a hardening agent and aluminum oxide spheres as a spacer.

The liquid crystal which can be used in the present invention includes nematic liquid crystals, smectic liquid crystals, and the like. Those materials which form nematic liquid crystals are preferred. Examples of such preferable materials include Schiff base liquid crystals, azoxy liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, cubane liquid crystals, and the like. To these liquid crystals may be added cholesteric liquid crystals, such as cholestyl (??cholesteryl??) chloride, cholesteryl nonanoate, cholesteryl carbonate, etc., or chiral compounds or agents commercially available under trade names C-15 and CB-15 (Merck Ltd.). Furthermore, there may be used ferroelectric liquid crystals such as p-decyloxybenzylidene-p-amino-2-methylbutylcinnamate.

The polarizing plate used on the outer surfaces of the liquid crystal cells may be a polarizing film, so-called H film, which is prepared by stretching and aligning polyvinyl alcohol while allowing it to absorb iodine, a polarizing plate which includes a protected H film obtained by sandwiching an H film by cellulose acetate films, and the like.

The liquid crystal aligning agent of the present invention is particularly suitable for use in forming liquid crystal aligning films for STN (Super Twisted Nematic) liquid crystal display devices and TN (Twisted Nematic) liquid crystal display devices.

The liquid crystal display devices with the liquid crystal aligning films formed from the liquid crystal aligning agent according to the present invention may also be used advantageously for SH (Super Homeotropic) liquid crystal display devices or ferroelectric liquid crystal display devices by appropriately selecting liquid crystal materials to be injected in between the substrates.

Furthermore, the liquid crystal display device with the liquid crystal aligning film formed from the liquid crystal aligning agent of the present invention has excellent ability in aligning the liquid crystal incorporated therein and highly reliable so that it can be used as a display device for a variety of types of apparatus such as desktop calculators, wrist watches, table clocks, counter display boards, word processors, personal computers, liquid crystal televisions, and the like.

EXAMPLES

Hereinafter, the present invention will be described in more detail by examples. However, the present invention should not be considered as being limited thereto.
Liquid Crystal Aligning Ability of Liquid Crystal Display Device Presence of abnormal domains in the liquid crystal cells of the liquid crystal display device when the power source was turned on or off was observed using a polarizing microscope. Absence of abnormal domains was judged "fair".
Uniformity of Coating Film Printed with Liquid Crystal Aligning Agent Coating films printed at ambient temperatures of 25° C. and 35° C. were measured of mean film thickness and fluctuations between maximum film thickness and minimum film thickness using a feeler film gauge.
Storage Stability of Liquid Crystal Aligning Agent Liquid crystal aligning agent was left to stand for a predetermined period of time in an incubator at a predetermined temperature and the viscosities of the liquid crystal aligning agent before and after the standing were measured using an model E viscometer.

Preparation Example 1

2,3,5-Tricarboxycyclopentylacetic dianhydride (44.8 g), p-phenylenediamine (21.0 g), and cholesteryl 3,5-diaminobenzoate (3.1 g) were dissolved in N-methyl-2-pyrrolidone (620 g) and allowed to react for 6 hours at room temperature. Then, the reaction mixture was poured in a large excess amount of methanol to precipitate a reaction product, which was then washed with methanol, dried for 15 hours under reduced pressure at 40° C. to yield 66.0 g of specific polymer (Aa) having an intrinsic viscosity of 1.21 dl/g.

Preparation Example 2

A portion (33.0 g) of the specific polymer (Aa) obtained in Preparation Example 1 was dissolved in γ-butyrolactone (570 g), to which were added pyridine (34.4 g) and acetic anhydride (26.6 g). Cyclization with dehydration was performed at 110° C. for 3 hours.

Preparation Example 3

Specific polymer (Ab) was obtained in the same manner as in Preparation Example 1 except that 4,4'-diaminodiphenylmethane (38.4 g) was used instead of p-phenylenediamine. Then, the same procedure as in Preparation Example 2 was repeated to obtain specific polymer (Bb) (26.2 g) having an intrinsic viscosity of 1.24 dl/g.

Preparation Example 4

The same procedure as in Preparation Example 1 was repeated except that the tetracarboxylic dianhydride was replaced by cyclobutanetetracarboxylic dianhydride (39.2 g) and the diamine was replaced by 2,2-bis[4-(4-aminophenoxy)phenyl]propane (82.1 g) to yield specific polymer (Ac) (115.5 g) having an intrinsic viscosity of 1.46 dl/g.

Preparation Example 5

The same procedure as in Preparation Example 1 was repeated except that the tetracarboxylic dianhydride was replaced by 1,3,3a,4,5,9b-hexahydro-5-(tetrahydro-2,5-dioxo-3-furanyl)naphtho[1,2-c]furan-1,3-dione (60.0 g) to yield specific polymer (Ad). Then, the specific polymer (Ad) was treated in the same procedure as in Preparation Example 2 to obtain specific polymer (Bd) (26.2 g) having an intrinsic viscosity of 1.16 dl/g.

Preparation Example 6

The same procedure as in Preparation Example 1 was repeated except that tetracarboxylic dianhydride was replaced by pyromellitic dianhydride (43.6 g) to yield specific polymer (Ae) having an intrinsic viscosity of 1.66 dl/g.

Example 1

(1) Preparation of Liquid Crystal Aligning Agent

The specific polymer (Aa) (5 g) obtained in Preparation Example 1 was dissolved in a mixture of N-methyl-2-pyrrolidone (71 g) as the first solvent and ethylene glycol methyl phenyl ether (49 g) as the second solvent to form a solution with a solids content of 4.0% by weight. The solution was filtered through a filter having a pore diameter of 1 µm to prepare a liquid crystal aligning agent.

The liquid crystal aligning agent contained solids in an amount of 4.0% by weight, the first solvent in an amount of 56.8% by weight, and the second solvent in an amount of 39.2% by weight.

A film formed from the liquid crystal aligning agent had a mean film thickness of 500 Å and maximum difference of 12 Å at an ambient temperature of 25° C. and a mean film thickness of 480 Å and maximum difference of 13 Å at an ambient temperature of 35° C.

(3) Formation of Liquid Crystal Aligning Film

The surface of the coating film thus formed was rubbed using a rubbing machine having a roll clad with rayon cloth to impart an ability of aligning liquid crystal molecules to the film, thus making a liquid crystal aligning film.

Here, the rubbing was performed under the following conditions:

Roll speed: 500 rpm
Translation speed of the stage: 1 cm/sec.
Pile Crush Length: 0.4 mm (4) Fabrication of Liquid Crystal Display Device Two substrates each having formed thereon a liquid crystal aligning film as described above were provided. On outer periphery of each substrate was screen printed an epoxy resin adhesive containing aluminum oxide spheres of 17 μm in diameter. Then, the two substrates were arranged so as to face each other at a gap such that the rubbing directions of the liquid crystal aligning films cross at right angles to each other. Thereafter, the outer peripheries of the two substrates were butted and pressed so that the adhesive was cured.

In each of the cell gaps defined by the surfaces of the two substrates and the adhesive at the outer peripheries was filled through an injection hole nematic liquid crystal (MLC-2002, trade name for a product by Merck Japan, Co., Ltd.), followed by sealing the injection hole with an epoxy adhesive to make a liquid crystal cells. Then, on a surface of each of the substrates opposite to the surface on which the sealant was provided a polarizing plate such that the direction of polarization by the polarizing plate coincided with or at right angles to the direction of rubbing of the liquid crystal aligning film on which the polarizing plate was provided through the substrate. Thus, a liquid crystal display device was fabricated.

Liquid crystal aligning ability of the thus fabricated liquid crystal display device was tested. As a result, no abnormal domain was detected in the display when the operation voltage was turned on or off. Thus, the liquid crystal aligning film in the display device was found to have an excellent liquid crystal aligning ability.

Examination of the liquid crystal aligning agent its for storage stability resulted in an initial viscosity of 41 cP, and also 41 cP after being left to stand at 25° C. for 6 months. Thus, it was confirmed that the liquid crystal aligning agent had an excellent storage stability. Table 1 shows the results obtained.

Examples 2 to 18 and Comparative Examples 1 and 2

Liquid crystal aligning agents were prepared in the same manner as in Example 1 from the specific polymers (A) and (B) obtained in Preparation Examples 2 to 6 according to the formulations shown in Tables 1, 1-2, 1-3, 2, 2-2, and 3. Then, liquid crystal display devices were fabricated in the same manner as in Example 1 except for using the liquid crystal aligning agents thus obtained.

The liquid crystal display devices obtained were each evaluated for the film thickness of the coating film, liquid crystal aligning ability and storage stability of the liquid crystal display device. Tables 1, 1-2, 1-3, 2, 2-2, and 3 show the results obtained.

TABLE 1

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 1 | Aa 4.0 | (a1) 56.8 | (a2) 39.2 | 500 480 | 12 13 | fair | 41 | 41 |
| Example 2 | Ba 4.0 | (a1) 56.8 | (a2) 39.2 | 510 485 | 12 15 | fair | 43 | 43 |
| Example 3 | Ba 4.0 | (b1) 56.8 | (a2) 39.2 | 505 498 | 10 11 | fair | 42 | 42 |
| Example 4 | Ba 4.0 | (c1) 56.8 | (a2) 39.2 | 510 500 | 10 11 | fair | 41 | 41 |

TABLE 1-2

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 5 | Ba 4.0 | (d1) 56.8 | (a2) 39.2 | 495 476 | 13 17 | fair | 40 | 40 |
| Example 6 | Ba 7.9 | (c1) 52.9 | (a2) 39.2 | 730 686 | 22 24 | fair | 90 | 90 |

TABLE 1-2-continued

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 7 | Ba 9.8 | (c1) 51.0 | (a2) 39.2 | 1100 1040 | 35 38 | fair | 280 | 280 |

TABLE 1-3

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 8 | Ba 1.0 | (c1) 59.8 | (a2) 39.2 | 250 230 | 8 12 | fair | 5 | 5 |
| Example 9 | Ba 4.0 | (c1) 56.8 | (b2) 39.2 | 500 475 | 13 15 | fair | 41 | 41 |
| Example 10 | Ba 4.0 | (c1) 56.8 | (c2) 39.2 | 500 485 | 14 15 | fair | 41 | 41 |

TABLE 2

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 11 | Ba 4.0 | (c1) 56.8 | (d2) 39.2 | 505 495 | 13 15 | fair | 41 | 41 |
| Example 12 | Ba 4.0 | (a1) 56.8 | (e2) 39.2 | 500 485 | 13 15 | fair | 41 | 41 |
| Example 13 | Aa 4.0 | (a1) 91.0 | (a2) 5.0 | 500 485 | 20 23 | fair | 41 | 41 |
| Example 14 | Aa 4.0 | (a1) 31.0 | (a2) 65.0 | 500 476 | 21 24 | fair | 41 | 41 |

TABLE 2-2

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 15 | Aa 4.0 | (a1) 31.0 | (a2) 55.0 | 500 486 | 8 8 | fair | 41 | 41 |
| Example 16 | Ac 4.0 | (a1) 56.8 | (a2) 39.2 | 520 500 | 13 15 | fair | 45 | 45 |
| Example 17 | Bd 4.0 | (c1) 56.8 | (a2) 39.2 | 486 477 | 12 13 | fair | 34 | 34 |
| Example 18 | Ae 4.0 | (a1) 56.8 | (a2) 39.2 | 530 519 | 12 13 | fair | 52 | 52 |

TABLE 3

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Comparative Example 1 | Ae 4.0 | (a1) 96.0 | — 0.0 | 540 500 | 68 110 | failure to display | 55 | 39 |
| Comparative Example 2 | Ae 4.0 | (a1) 56.8 | (f2) 39.2 | 520 498 | 55 59 | failure to display | 56 | 40 |

In Tables 1, 1-2, 1-3, 2, 2-2, and 3, the upper rows in the columns of "Specific Polymer, "First Solvent", and "Second Solvent" indicate the kind of the solvent used while the lower rows indicate the proportions of the solvent used in terms of % by weight.

Furthermore, in Tables 1, 1-2, 1-3, 2, 2-2, and 3, the first and second solvents and comparative solvents were as follows:

First solvent:
- (a1) N-methyl-2-pyrrolidone
- (b1) N-ethyl-2-pyrrolidone
- (c1) γ-butyrolactone
- (d1) 1,3-dimethyl-2-imidazolidinone Second solvent:
- (a2) ethylene glycol methyl phenyl ether
- (b2) ethylene glycol ethyl phenyl ether
- (c2) diethylene glycol methyl phenyl ether
- (d2) propylene glycol methyl phenyl ether
- (e2) ethylene glycol phenyl ether acetate
- (f2) butylcellosolve Preparation Example 6

2,3,5-Tricarboxycyclopentylacetic dianhydride (44.8 g) and p-phenylenediamine (21.6 g) were dissolved in N-methyl-2-pyrrolidone (988 g) and allowed to react at room temperature for 6 hours. The reaction mixture thus obtained was poured in a large excess amount of methanol to precipitate a polyamic acid, which was washed with methanol, dried under reduced pressure at 40° C. for 15 hours to yield a polymer (A-1) (60.2 g) having an inherent viscosity of 1.44 dl/g.

Preparation Example 7

A portion (33.0 g) of the polymer (A-1) obtained in Preparation Example 6 was dissolved in γ-butyrolactone (570 g), to which were added pyridine (21.6 g) and acetic anhydride (16.74 g). Imidation was performed at 120° C. for 3 hours. The resulting polymer was precipitated in the same manner as in Preparation Example 6 to obtain a polymer (B-1) (24.0 g) having an inherent viscosity of 1.35 dl/g.

Preparation Example 8

A polymer (A-2) was obtained in the same manner as in Preparation Example 6 except that 4,4'-diaminodiphenylmethane (33.6 g) was used as the diamine compound. Then, the same procedure as in Preparation Example 7 was repeated to obtain a polymer (B-2) (22.2 g) having an intrinsic viscosity of 1.16 dl/g.

Preparation Example 9

The same procedure as in Preparation Example 6 was repeated except that the tetracarboxylic dianhydride was replaced by cyclobutanetetracarboxylic dianhydride (39.22 g) to yield a polymer (A-3) (50.5 g) having an intrinsic viscosity of 1.26 dl/g.

Preparation Example 10

The same procedure as in Preparation Example 6 was repeated except that the tetracarboxylic dianhydride was replaced by 1,3,3a,4,5,9b-hexahydro-5-(tetrahydro-2,5-dioxo-3-furanyl)naphtho[1,2-c]furan-1,3-dione (60.0 g) to yield a polymer (A-4). Then, the polymer (A-4) was treated in the same procedure as in Preparation Example 7 for imidation to obtain specific polymer (B-4) (22.2 g) having an intrinsic viscosity of 1.16 dl/g.

Preparation Example 11

The same procedure as in Preparation Example 6 was repeated except that tetracarboxylic dianhydride was replaced by pyromellitic dianhydride (43.6 g) to yield specific polymer (A-5) (60.5 g) having an intrinsic viscosity of 1.66 dl/g.

Preparation Example 12

A polymer (A-6) was obtained in the same manner as in Preparation Example 6 except that butanetetracarboxylic dianhydride (39.6 g) was used as the tetracarboxylic dianhydride compound. Then, the same procedure as in Preparation Example 7 was repeated for imidation to obtain a polymer (B-6) (21.2 g) having an intrinsic viscosity of 1.01 dl/g.

Example 19

(1) Preparation of Liquid Crystal Aligning Agent

The polymer (A-1) (1.0 g) obtained in Preparation Example 6 was dissolved in N-methyl-2-pyrrolidone (21.6 g) as the first solvent. To the resulting solution was added methyl 3-methoxypropionate (2.4 g). The resulting solution was filtered through a filter having a pore diameter of 1 μm to prepare a liquid crystal aligning agent.

The liquid crystal aligning agent contained solids in an amount of 4.0% by weight, the first solvent in an amount of 86.4% by weight, and the second solvent in an amount of 9.6% by weight.

(2) Thin Film Formation

A thin film was formed in the same manner as in Example 1 from the liquid crystal aligning agent thus obtained. The thin film had a mean film thickness of 500 Å and maximum difference of 15 Å.

The thin film was subjected to aligning treatment in the same manner as in Example 1

(3) Formation of Liquid Crystal Aligning Film

In the same manner as in Example 1, the liquid crystal aligning film was oriented.

(4) Fabrication of Liquid Crystal Display Device

Subsequently, a liquid crystal display device was fabricated in the same manner as in Example 1 using nematic crystal MLC-2001 (Merck Japan Co., Ltd.) as the liquid crystal.

Liquid crystal aligning ability of the thus fabricated liquid crystal display device was tested. As a result, no abnormal domain was detected in the display when the operation voltage was turned on or off. Thus, the liquid crystal aligning film in the display device was found to have an excellent liquid crystal aligning ability.

Examination of the liquid crystal aligning agent its for storage stability resulted in an initial viscosity of 40 cP, and also 40 cP after being left to stand at 40° C. for 2 months. Thus, it was confirmed that the liquid crystal aligning agent had an excellent storage stability. Table 4, 4-2, and 4-3 shows the results obtained.

Examples 20 to 44

Liquid crystal aligning agents were prepared in the same manner as in Example 19 from the specific polymers obtained in Preparation Examples 7 to 12 according to the formulations shown in Tables 4, 4-2, 4-3, 2, 2-2, 5, 5-2, and 5-3. Then, liquid crystal display devices were fabricated in the same manner as in Example 19 except for using the liquid crystal aligning agents thus obtained.

The liquid crystal display devices obtained were each evaluated for the film thickness of the coating film, liquid crystal aligning ability and storage stability of the liquid crystal display device. Tables 4, 4-2, 4-3, 2, 2-2, 5, 5-2, and 5-3 show the results obtained.

Comparative Example 3

A comparative liquid crystal aligning agent was prepared in the same manner as in Preparation Example 6 except that the polymer (A-1) (1.0 g) obtained in Preparation Example 6 was dissolved in N-methyl-2-pyrrolidone (24.0 g) as the first solvent and that the second solvent was not added to the resulting solution. A liquid crystal display device was fabricated in the same manner as in Example 19 using this comparative liquid crystal aligning agent.

The same evaluations as in Example 19 were made. Tables 5, 5-2, and 5-3 show the results obtained. The liquid crystal display device having a liquid crystal aligning film made from the comparative liquid crystal aligning agent suffered non-uniformity in display which was considered to be ascribable to the uneven film thickness of the comparative liquid crystal aligning film.

Comparative Example 4

A comparative liquid crystal aligning agent was prepared in the same manner as in Example 6 except that the polymer (A-1) (1.0 g) obtained in Preparation Example 6 was dissolved in N-methyl-2-pyrrolidone (6.0 g) and that to the resulting solution was added methyl 3-methoxypropionate (18.0 g) as the second solvent.

The liquid crystal aligning agent contained solids in an amount of 4.0% by weight, the first solvent in an amount of 24.0% by weight, and the second solvent in an amount of 72.0% by weight. Thus, the first solvent was in a relatively small amount and the second solvent was in an excessive amount.

The liquid crystal aligning agent gave a solution which was poorly filterable through a filter, and the filtrate was turbid.

A liquid crystal display device was fabricated in the same manner as in Example 19 using this comparative liquid crystal aligning agent.

The same evaluations as in Example 19 were made on the liquid crystal display device thus fabricated and the Table 5, 5-2, and 5-3 show the results obtained. In the liquid crystal display device with the liquid crystal aligning film made from the liquid crystal aligning agent suffered the occurrence of display failure which was considered to be ascribable to unevenness in the film thickness of the liquid crystal aligning film.

Comparative Example 5

A comparative liquid crystal aligning agent was prepared in the same manner as in Example 19 except that the polymer (A-1) (1.0 g) obtained in Preparation Example 6 was dissolved in N-methyl-2-pyrrolidone (21.6 g) and that to the resulting solution was added ethylene glycol monobutyl ether (2.4 g) (comparative solvent).

The liquid crystal aligning agent contained solids in an amount of 4.0% by weight, the first solvent in an amount of 86.4% by weight, and the comparative solvent in an amount of 9.6% by weight. In this case, the comparative solvent used in place of the second solvent has a chemical structure different from that of the compound represented by the general formula (I).

A liquid crystal display device was fabricated in the same manner as in Example 19 using this comparative liquid crystal aligning agent.

The same evaluations as in Example 19 were made on the liquid crystal display device thus fabricated and the Table 5, 5-2, and 5-3 show the results obtained. In the liquid crystal display device with the liquid crystal aligning film made from the comparative liquid crystal aligning agent suffered the occurrence of display failure which was considered to be ascribable to unevenness in the film thickness of the liquid crystal aligning film. The comparative liquid crystal aligning agent showed a change in viscosity to a great extent and found to be poor in storage stability.

TABLE 4

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 19 | A-1 4.0 | (a1) 86.4 | (a2) 9.6 | 500 | 15 | fair | 40 | 40 |
| Example 20 | A-1 4.0 | (a1) 91.2 | (a2) 4.8 | 510 | 20 | fair | 40 | 40 |
| Example 21 | A-1 4.0 | (a1) 81.6 | (a2) 14.4 | 490 | 15 | fair | 40 | 40 |
| Example 22 | A-1 4.0 | (a1) 76.8 | (a2) 19.2 | 485 | 25 | fair | 40 | 40 |
| Example 23 | A-1 4.0 | (a1) 61.0 | (a2) 35.0 | 480 | 26 | fair | 40 | 40 |
| Example 24 | A-1 9.8 | (a1) 80.0 | (a2) 10.2 | 1020 | 28 | fair | 280 | 278 |

TABLE 4-2

| | Specific Polymer (Wt %) | First Solvent (Wt %) | Second Solvent (Wt %) | | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|---|
| Example 25 | A-1 8.0 | (a1) 82.4 | (a2) 9.6 | | 700 | 15 | fair | 90 | 90 |
| Example 26 | A-1 1.0 | (a1) 87.0 | (a2) 12.0 | | 250 | 10 | fair | 6 | 6 |
| Example 27 | A-1 1.0 | (a1) 60.5 | (a2) 38.5 | | 230 | 12 | fair | 6 | 6 |
| Example 28 | B-1 4.0 | (a1) 86.4 | (a2) 9.6 | | 490 | 13 | fair | 38 | 38 |
| Example 29 | B-1 4.0 | (a1) 86.4 | (b2) 9.6 | | 490 | 10 | fair | 38 | 38 |
| Example 30 | B-1 4.0 | (a1) 86.4 | (a2) 4.8 | (b2) 4.8 | 490 | 13 | fair | 38 | 38 |

TABLE 4-3

| | Specific Polymer (Wt %) | First Solvent (Wt %) | Second Solvent (Wt %) | | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|---|
| Example 31 | B-1 4.0 | (a1) 86.4 | (a2) 8.0 | (b2) 1.6 | 495 | 13 | fair | 38 | 38 |
| Example 32 | B-1 4.0 | (a1) 86.4 | (a2) 1.6 | (b2) 8.0 | 490 | 13 | fair | 38 | 38 |

TABLE 5

| | Specific Polymer (Wt %) | First Solvent (Wt %) | Second Solvent (Wt %) | | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|---|
| Example 33 | B-1 4.0 | (a1) 86.4 | (a2) 9.6 | | 490 | 12 | fair | 38 | 38 |
| Example 34 | B-1 4.0 | (a1) 86.4 | (a2) 4.8 | (b2) 4.8 | 495 | 12 | fair | 38 | 38 |
| Example 35 | B-1 4.0 | (b1) 86.4 | (b2) 9.6 | | 505 | −10 | fair | 38 | 38 |
| Example 36 | B-1 4.0 | (b1) 86.4 | (a2) 4.8 | (b2) 4.8 | 495 | 10 | fair | 38 | 38 |
| Example 37 | A-2 4.0 | (b1) 86.4 | (b2) 9.6 | | 485 | 13 | fair | 37 | 37 |
| Example 38 | B-2 4.0 | (b1) 86.4 | (b2) 9.6 | | 495 | 12 | fair | 37 | 37 |

TABLE 5-2

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Example 39 | A-3 4.0 | (a1) 86.4 | (b2) 9.6 | 510 | 15 | fair | 39 | 39 |
| Example 40 | A-4 4.0 | (b1) 86.4 | (b2) 9.6 | 480 | 14 | fair | 36 | 36 |
| Example 41 | B-4 4.0 | (a1) 86.4 | (b2) 9.6 | 495 | 14 | fair | 38 | 38 |
| Example 42 | A-5 4.0 | (a1) 86.4 | (b2) 9.6 | 530 | 15 | fair | 45 | 45 |
| Example 43 | A-6 4.0 | (a1) 86.4 | (b2) 9.6 | 460 | 12 | fair | 34 | 34 |
| Example 44 | B-6 4.0 | (b1) 86.4 | (b2) 9.6 | 465 | 13 | fair | 33 | 33 |

TABLE 5-3

| | Specific Polymer (Wt %) | First Solvent (Wt %) | Second Solvent (Wt %) | Thickness 25° C. 35° C. Mean value (Å) | Thickness 25° C. 35° C. Maximum Difference (Å) | Liquid Crystal Orientation | Viscosity of Aligning Agent (cP) Before Standing | Viscosity of Aligning Agent (cP) After Standing |
|---|---|---|---|---|---|---|---|---|
| Comparative Example 3 | A-1 4.0 | (a1) 96.0 | — 0.0 | 470 | 80 | uneven | 40 | 40 |
| Comparative Example 4 | A-1 4.0 | (a1) 52.8 | (a2) 43.2 | 510 | 150 | failure to display | 40 | 40 |
| Comparative Example 5 | A-1 4.0 | (a1) 86.4 | (X2) 9.6 | 510 | 50 | uneven | 40 | 31 |

In Tables 4, 4-2, 4-3, 5, 5-2, and 5-3, the first and second solvents and comparative solvents were as follows:
First solvent:
(a1) N-methyl-2-pyrrolidone
(b1) γ-butyrolactone
Second solvent:
(a2) methyl 3-methoxypropionate
(b2) ethyl 3-ethoxypropionate
Comparative Solvent:
(x2) ethylene glycol monobutyl ether

Preparation Example 13

2,3,5-Tricarboxycyclopentylacetic dianhydride (44.8 g), p-phenylenediamine (32.87 g; 146.6 mmol), compound (III-1) (1.12 g; 1.5 mmol), and p-phenylenediamine (16.02 g; 148.1 mmol) were dissolved in N-methyl-2-pyrrolidone (450 g) and allowed to react at 60° C. for 6 hours.

Then, the reaction mixture was poured in a large excess amount of methanol to precipitate a reaction product, which was then washed with methanol, dried for 15 hours at 40° C. under reduced pressure to yield specific polymer (AF) (40.25 g) having an inherent viscosity of 1.04 dl/g.

Preparation Example 14

A portion (25.0 g) of the specific polymer (Af) obtained in Preparation Example 13 was dissolved in N-methyl-2-pyrrolidone (475 g), to which were added pyridine (11.72 g) and acetic anhydride (15.12 g). Cyclization with dehydration was carried out at 115° C. for 4 hours.

Then, the reaction mixture was allowed to form precipitates in the same manner as in Preparation Example 13 to yield specific polymer (Bf) (16.55 g) having an inherent viscosity of 1.06 dl/g.

Preparation Example 15

Specific polymer (Ag) was obtained in the same manner as in Preparation Example 13 except that 2,3,5-tricarboxycyclopentylacetic dianhydride (29.67 g; 132.4 mmol), compound (III-1) (5.26 g; 7.0 mmol), and p-phenylenediamine (15.07 g; 139.4 mmol) were used. Then, the same procedure as in Preparation Example 14 was repeated for cyclization with dehydration to obtain specific polymer (Bg) (17.00 g) having an inherent viscosity of 1.24 dl/g.

Preparation Example 16

Specific polymer (Ah) was obtained in the same manner as in Preparation Example 13 except that 2,3,5-tricarboxycyclopentylacetic dianhydride (26.18 g; 116.8 mmol), compound (III-1) (9.79 g; 13.0 mmol), and p-phenylenediamine (14.03 g; 129.7 mmol) were used. Then, the same procedure as in Preparation Example 14 was repeated for cyclization with dehydration to obtain specific polymer (Bh) (17.12 g) having an inherent viscosity of 0.98 dl/g.

Preparation Example 17

The same procedure as in Preparation Example 13 was repeated except that only compound (III-1) (34.74 g; 57.9 g) was used as the tetracarboxylic dianhydride and that p-phenylenediamine (6.26 g; 57.9 mmol) was used as the diamine compound to yield specific polymer (Ai) (40.52 g) having an inherent viscosity of 0.77 dl/g.

Preparation Example 18

Specific polymer (Aj) was obtained in the same manner as in Preparation Example 13 except that 2,3,5-tricarboxycyclopentylacetic dianhydride (23.72 g; 105.8 mmol), compound (III-1) (4.20 g; 5.6 mmol), and 4-diaminodiphenylmethane (22.08 g; 111.4 mmol) were used. Then, the same procedure as in Preparation Example 14 was repeated for cyclization with dehydration to obtain specific polymer (Bj) (17.55 g) having an inherent viscosity of 0.80 dl/g.

Preparation Example 19

The same procedure as in Preparation Example 13 was repeated except that only compound (III-1) (39.60 g; 52.5 g) was used as the tetracarboxylic dianhydride and that 4,4'-diphenyldiaminomethane (10.40 g; 52.5 mmol) was used as the diamine compound to yield specific polymer (Ak) (40.22 g) having an inherent viscosity of 0.77 dl/g.

Preparation Example 20

The same procedure as in Preparation Example 13 was repeated except that pyromellitic dianhydride (29.34 g; 134.5 mmol), compound (III-1) (5.35 g; 7.1 mmol), and p-phenylenediamine (15.31 g; 141.6 mmol) to yield a specific polymer (Al) (39.52 g) having an inherent viscosity of 1.25 dl/g.

Preparation Example 21

Specific polymer (Am) was obtained in the same manner as in Preparation Example 13 except that 2,3,5-tricarboxycyclopentylacetic dianhydride (32.87 g; 146.6 mmol), compound (III-2) (1.12 g; 1.5 mmol), and p-phenylenediamine (16.02 g; 148.1 mmol) were used. Then, the same procedure as in Preparation Example 14 was repeated using the specific polymer (Am) for cyclization with dehydration to obtain a specific polymer (Bm) (16.55 g) having an inherent viscosity of 0.89 dl/g.

Preparation Example 22

Specific polymer (Am) was obtained in the same manner as in Preparation Example 13 except that 2,3,5-tricarboxycyclopentylacetic dianhydride (32.87 g; 146.6 mmol), compound (III-3) (1.12 g; 1.5 mmol), and p-phenylenediamine (11.02 g; 148.1 mmol) were used. Then, the same procedure as in Preparation Example 14 was repeated using the specific polymer (An) for cyclization with dehydration to obtain a specific polymer (Bn) (17.00 g) having an inherent viscosity of 0.90 dl/g.

Next, evaluation of the liquid crystal aligning agents obtained as described above were made as described in Example 45 hereinbelow.

In the following examples, measurement of pretilt angles were performed using the crystal rotation method using a He-Ne laser beam in accordance with the method described in T. J. Scheffer, et al., J. Appl. Phys., vol. 19, p.2013 (1980).

Presence of abnormal domains in the liquid crystal cells of the liquid crystal display device when the power source was turned on or off was observed using a polarizing microscope. Absence of abnormal domains was judged "fair".

Adhesion of the liquid crystal aligning film to the substrate was evaluated based on the occurrence of peeling-off of the liquid crystal aligning film when the film formed on an ITO substrate was rubbed.

Example 45

The specific polymer (Bf) (5 g) obtained in Preparation Example 14 was dissolved in a mixture of 90% by weight of g-butyrolactone as the first solvent and 10% by weight of ethyl 3-ethoxypropionate as the second solvent to obtain a solution with a solids content of 4% by weight. This solution was filtered through a filter having a pore diameter of 1 μm to prepare a liquid crystal aligning agent.

The solution was coated to a film thickness of 800 Å on a glass substrate provided with a transparent electrode made of an ITO film using a spinner. The wet coating film was dried at 180° C. for 1 hour to form a dry coating film.

The surface of the coating film thus formed was rubbed using a rubbing machine having a roll clad with rayon cloth under the conditions of a roll speed of 500 rpm, a translation of speed of 1 cm/sec. and a pile crush length of 0.4 mm. This rubbing treatment was repeated twice when the adhesion between the liquid crystal aligning film and the substrate was fair and there was observed no peeling-off of the film due to the rubbing treatment.

Two substrates each having formed thereon a liquid crystal aligning film as described above were provided. On outer periphery of each substrate was screen printed an epoxy resin adhesive containing aluminum oxide spheres of 17 μm in diameter. Then, the two substrates were arranged so as to face each other at a gap such that the rubbing directions of the liquid crystal aligning films are antiparallel to each other. Thereafter, the outer peripheries of the two substrates were butted and pressed so that the adhesive was cured.

In each of the cell gaps defined by the surfaces of the two substrates and the adhesive at the outer peripheries was filled through an injection hole nematic liquid crystal (MLC-2001, trade name for a product by Merck Japan, Co., Ltd.), followed by sealing the injection hole with an epoxy adhesive to make a liquid crystal cells. Then, on a surface of each of the substrates opposite to the surface on which the sealant was provided a polarizing plate such that the direction of polarization by the polarizing plate coincided with the direction of rubbing of the liquid crystal aligning film on which the polarizing plate was provided through the substrate. In this manner, 10 liquid crystal display devices were fabricated. Then, pretilt angles of these liquid crystal display device were measured. As a result, their pretilt angles were 3.0° with a fluctuation of ±0.2°.

Examples 46 to 71

Liquid crystal display devices were fabricated in the same manner as in Example 45 except that the specific polymers (Bf), (Bg), (Bh), (Bi), (Bj), (Bk), (Bm), and (Bn) were used, film thicknesses were in the range of from 200 to 1,500 Å, the rubbing treatment was carried out from 1 to 5 times. The liquid crystal display devices thus fabricated were measured of liquid crystal aligning ability and pretilt angle. Tables 6 and 7 show the results obtained.

TABLE 6

| Example | Polymer | Thickness (Å) | Number of Rubbing (Time) | Pretilt (°) Mean Value | Pretilt (°) Fluctuation | Liquid Crystal Orientation |
|---|---|---|---|---|---|---|
| 45 | (IIf) | 800 | 2 | 3.0 | ±0.2 | fair |
| 46 | (IIf) | 200 | 2 | 2.9 | ±0.2 | fair |
| 47 | (IIf) | 1500 | 2 | 3.2 | ±0.3 | fair |
| 48 | (IIf) | 800 | 1 | 3.3 | ±0.1 | fair |
| 49 | (IIf) | 800 | 5 | 3.0 | ±0.1 | fair |
| 50 | (IIg) | 200 | 2 | 6.1 | ±0.2 | fair |
| 51 | (IIg) | 800 | 2 | 6.6 | ±0.3 | fair |
| 52 | (IIg) | 1500 | 2 | 6.5 | ±0.3 | fair |
| 53 | (IIg) | 800 | 1 | 6.3 | ±0.3 | fair |
| 54 | (IIg) | 800 | 5 | 5.9 | ±0.2 | fair |
| 55 | (IIh) | 800 | 2 | 9.8 | ±0.3 | fair |
| 56 | (IIi) | 500 | 2 | 89 | 0 | fair |
| 57 | (Ii) | 800 | 2 | 89 | 0 | fair |
| 58 | (Ii) | 800 | 5 | 89 | 0 | fair |
| 59 | (IIi) | 800 | 2 | 4.4 | ±0.2 | fair |
| 60 | (Ik) | 800 | 2 | 89 | 0 | fair |

TABLE 7

| Example | Polymer | Film Thickness (Å) | Number of Rubbing (Time) | Pretilt (°) Mean Value | Pretilt (°) Fluctuation | Liquid Crystal Orientation |
|---|---|---|---|---|---|---|
| 61 | (A1) | 800 | 2 | 7.5 | ±0.2 | fair |
| 62 | (Bm) | 200 | 2 | 3.2 | ±0.3 | fair |
| 63 | (Bm) | 800 | 2 | 3.3 | ±0.2 | fair |
| 64 | (Bm) | 1500 | 2 | 3.4 | ±0.2 | fair |
| 65 | (Bm) | 800 | 1 | 3.6 | ±0.3 | fair |
| 66 | (Bm) | 800 | 5 | 3.0 | ±0.2 | fair |
| 67 | (Bn) | 200 | 2 | 3.0 | ±0.2 | fair |
| 68 | (Bn) | 800 | 2 | 3.2 | ±0.2 | fair |
| 69 | (Bn) | 1500 | 2 | 3.3 | ±0.1 | fair |
| 70 | (Bn) | 800 | 1 | 3.4 | ±0.1 | fair |
| 71 | (Bn) | 800 | 5 | 3.1 | ±0.2 | fair |

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A liquid crystal aligning agent comprising a solution comprising:

(1) at least one polymer selected from the group consisting of a polyamic acid obtainable by a reaction between a tetracarboxylic acid dianhydride and a diamine compound and an imidized polymer obtainable by cyclization with dehydration of the polyamic acid;

(2) at least one first solvent selected from the group consisting of N-alkyl-2-pyrrolidones, lactones, and 1,3-dialkyl-2-imidazolidinones; and, (3) at least one second solvent selected from the group consisting of:

(a) a first compound represented by the formula (I)

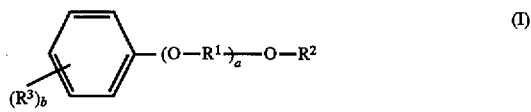

wherein $R^1$ is an alkylene group having 2 or 3 carbon atoms; $R^2$ is an alkyl group having 1 to 4 carbon atoms an acetyl group or a propionyl group; $R^3$ is an alkyl group having 1 to 3 carbon atoms, an alkoxyl group having 1 to 3 carbon atoms, or a halogen atom; a is 1 or 2; and b is 0 or integers of from 1 to 5; and (b) a second compound represented by the formula (II)

wherein $R^4$ is an alkyl group having 1 to 4 carbon atoms; $R^5$ is an alkylene group having 2 or 3 carbon atoms; $R^6$ is an alkyl group having 1 to 3 carbon atoms; and c is 1 or 2.

2. The liquid crystal aligning agent as claimed in claim 1, wherein said solution is a homogeneous solution comprising:

(a) 1 to 10% by weight of said polymer (1);

(b) 29 to 95% by weight of said first solvent (2); and (c) 4 to 70% by weight of said second solvent (3).

3. The liquid crystal aligning agent as claimed in claim 1, wherein said at least one second solvent is a first compound having the formula (I):

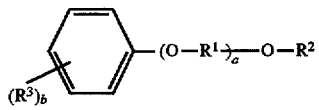

wherein $R^1$ is an alkylene group having 2 or 3 carbon atoms; $R^2$ is an alkyl group having 1 to 4 carbon atoms, an acetyl group or a propionyl group; $R^3$ is an alkyl group having 1 to 3 carbon atoms, an alkoxyl group having 1 to 3 carbon atoms, or a halogen atom; a is 1 or 2; and b is 0 or integers of from 1 to 5.

4. The liquid crystal aligning agent as claimed in claim 3, wherein said first compound is selected from the group consisting of ethylene glycol methylphenylether, ethylene glycol ethylphenylether, diethylene glycol methylphenylether, propylene glycol methylphenylether, propylene glycol methylphenylether, propylene glycol ethylphenylether, dipropylene glycol methylphenylether, ethylene glycol phenylether acetate, and propylene glycol phenylether acetate, and mixtures thereof.

5. The liquid crystal aligning agent as claimed in claim 1, wherein said at least one second solvent is a second compound having the formula (II):

wherein $R^4$ is an alkyl group having 1 to 4 carbon atoms; $R^5$ is an alkylene group having 2 or 3 carbon atoms; $R^6$ is an alkyl group having 1 to 3 carbon atoms; and C is 1 or 2.

6. The liquid crystal aligning agent as claimed in claim 5, wherein said second compound is selected from the group consisting of methyl 3-methoxypropionate, ethyl 3-ethoxypropionate, ethyl 3-methoxypropionate, and mixtures thereof.

7. The liquid crystal aligning agent as claimed in claim 6, wherein said second compound is selected from the group consisting of methyl 3-methoxypropionate, ethyl 3-ethoxypropionate, and mixtures thereof.

8. The liquid crystal aligning agent as claimed in claim 1, further comprising a functional silane group containing compound.

9. The liquid crystal aligning agent as claimed in claim 1, further comprising a thermosetting resin.

10. The liquid crystal aligning agent as claimed in claim 9, further comprising a base catalyst.

11. The liquid crystal aligning agent as claimed in claim 1, wherein said tetracarboxylic acid dianhydride is selected from the group consisting of butantetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 5-(2,5-dioxytetrahydrofuryl)-3-methyl-3-cyclohexane-1,2-dicarboxylic dianhydride, 1,3,3a,4,5,9b-hexahydro-5-(tetrahydro-2-5-dioxo-3-furanyl)naphtho(1,2-c)furan-1,3-dione,1,3,3a,4,5,9b-hexahydro-8-,methyl-5-(tetrahydro-2,5-dioxo-3-furanyl)naphtho(1,2-c)furan-1,3-dione, bicyclo(2,2,2)-oct-7-ene-2,3,5,6-tetracarboxylic dianhydride, pyrromelletic dianhydride,3,3',4,4'-benzophenonetetracarboxylic dianhydride,3,3',4,4'-biphenylsulfonetetracarboxylic dianhydride, tetracyclo-(6.2.1.0$^2$,7)dodecane-4,5,9,10-tetracarboxylic dianhydride, 3,3',4,4'-perfluoroisopropylidenephthalic dianhydride,3,3',4, 4'-biphenyltetracarboxylic dianhydride and compounds of the formula (III):

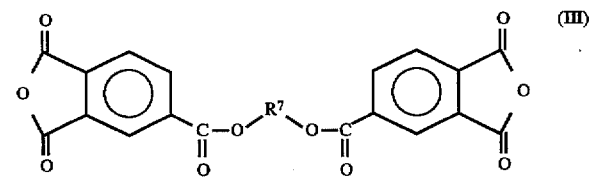

wherein $R^7$ is a divalent organic group selected from the group consisting of groups of the formulae (IV) to (IX):

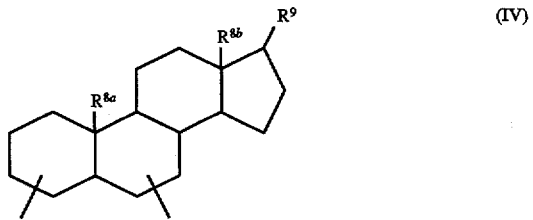

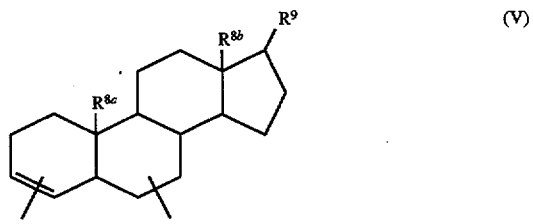

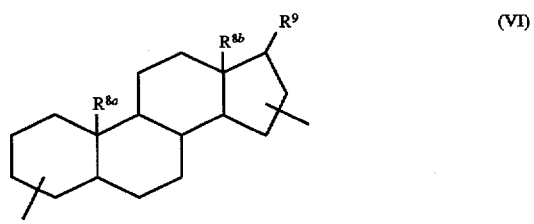

43

-continued

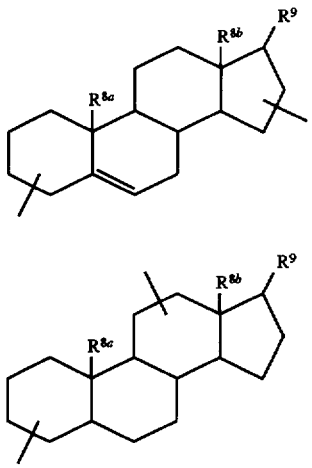

(VIII)

44

-continued

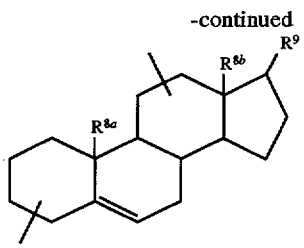

(VII)

(IX)

wherein $R^{8a}$ and $R^{8b}$ are independently a methyl group or a hydrogen atom; and $R^9$ is an alkyl group having 1 to 20 carbon atoms.

12. The liquid crystal aligning agent as claimed in claim 11, wherein said compound of the formula (III) is at least one selected from the group consisting of compounds having the formulae (III-1), (III-2) and (III-3):

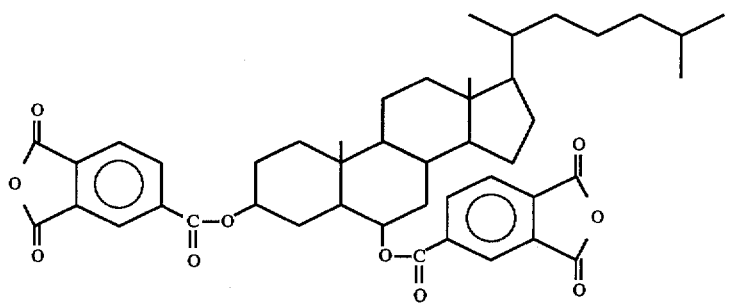

(III-1)

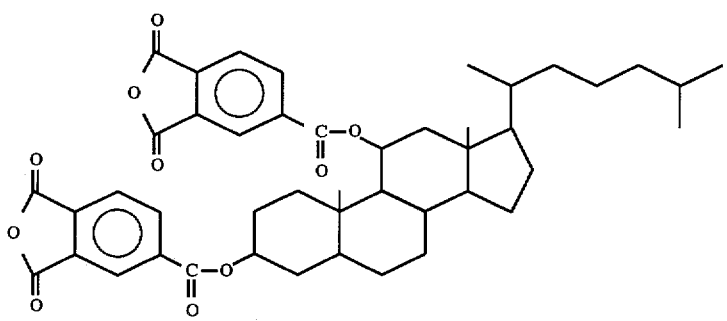

(III-2)

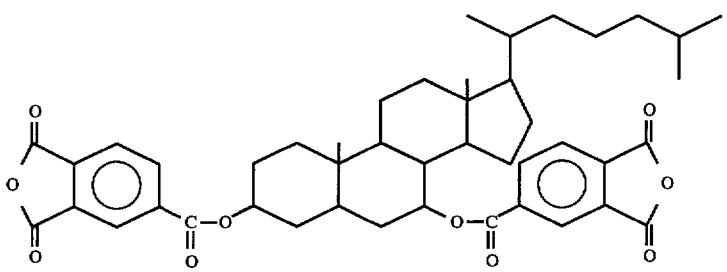

(III-3)

* * * * *